US007890861B2

(12) United States Patent
Yamamoto

(10) Patent No.: US 7,890,861 B2
(45) Date of Patent: Feb. 15, 2011

(54) APPARATUS AND METHOD FOR INFORMATION PROCESSING ACCORDING TO PRODUCTION INFORMATION

(75) Inventor: Hiroyuki Yamamoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 816 days.

(21) Appl. No.: 11/902,397

(22) Filed: Sep. 21, 2007

(65) Prior Publication Data

US 2008/0077861 A1 Mar. 27, 2008

(30) Foreign Application Priority Data

Sep. 22, 2006 (JP) ............................ 2006-258034

(51) Int. Cl.
*G06F 17/00* (2006.01)

(52) U.S. Cl. ......................... 715/273; 715/274; 358/1.1

(58) Field of Classification Search ................. 715/273, 715/274, 255, 256; 358/1.1
See application file for complete search history.

(56) References Cited

U.S. PATENT DOCUMENTS

| | | | | |
|---|---|---|---|---|
| 5,634,134 | A * | 5/1997 | Kumai et al. | 715/223 |
| 7,777,904 | B2 * | 8/2010 | Van Den Tillaart et al. | 358/1.15 |
| 2001/0051952 | A1 * | 12/2001 | Nakazato | 707/104.1 |
| 2003/0014441 | A1 * | 1/2003 | Suzuki et al. | 707/513 |
| 2003/0229859 | A1 * | 12/2003 | Shiraishi et al. | 715/541 |
| 2007/0019215 | A1 * | 1/2007 | Yu | 358/1.3 |
| 2008/0004506 | A1 * | 1/2008 | Ikeda et al. | 600/300 |
| 2008/0263444 | A1 * | 10/2008 | Fujimaki | 715/273 |
| 2009/0006951 | A1 * | 1/2009 | Mori et al. | 715/273 |
| 2009/0103116 | A1 * | 4/2009 | Ariga et al. | 358/1.9 |

FOREIGN PATENT DOCUMENTS

| | | |
|---|---|---|
| JP | 7-160149 | 6/1995 |
| JP | 2006-93824 | 4/2006 |

* cited by examiner

*Primary Examiner*—Thu Huynh
(74) *Attorney, Agent, or Firm*—Baker Botts L.L.P.

(57) ABSTRACT

An information processing apparatus includes an operating unit, a display, an attaching unit to which an external storage medium is attachable and a controller. The controller sequentially stores operation information corresponding to an input operating instruction and display information corresponding to a content displayed on the display in inputting the operating instruction as one set of reproduction information in the external storage medium, reads one set of the stored reproduction information in an order in which the operating instruction is input, and determines whether a display information corresponding to a content displayed on the display in accordance with the reading of the one set of the reproduction information coincides with the display information included in the read reproduction information. The controller controls the apparatus in accordance with the operating instruction included in the read reproduction information when a result of the determination indicates coincidence.

9 Claims, 7 Drawing Sheets

FIG. 3A

14a

14a1 14a2

| KEY CODE | OPERATION INPUT KEY |
|---|---|
| 1 | MENU |
| 2 | ← |
| 3 | → |
| 4 | DETERMINATION |
| 5 | START RECORDING |
| 6 | END RECORDING |
| 7 | START REPRODUCTION |
| 8 | KEY 1 |

FIG. 3B

14b

14b1 14b2 14b3

| PANEL DISPLAY NUMBER | DISPLAY CHARACTER STRING (JAPANESE) | DISPLAY CHARACTER STRING (ENGLISH) |
|---|---|---|
| 1 | READY | READY |
| 2 | PRINTING | PRINTING |
| 3 | SETUP RECEIVE | SETUP RECEIVE |
| 4 | SETUP SEND | SETUP SEND |
| 5 | COPY MODE | COPY MODE |
| 6 | AUTO | AUTO |
| 7 | TEXT | TEXT |
| 8 | PHOTO | PHOTO |

FIG. 4

F200

| PANEL DISPLAY NUMBER (F1) | KEY CODE (F2) |
|---|---|
| 1 | 1 |
| 3 | 3 |
| 4 | 3 |
| 5 | 4 |
| 6 | 3 |
| 7 | 3 |
| 8 | 4 |

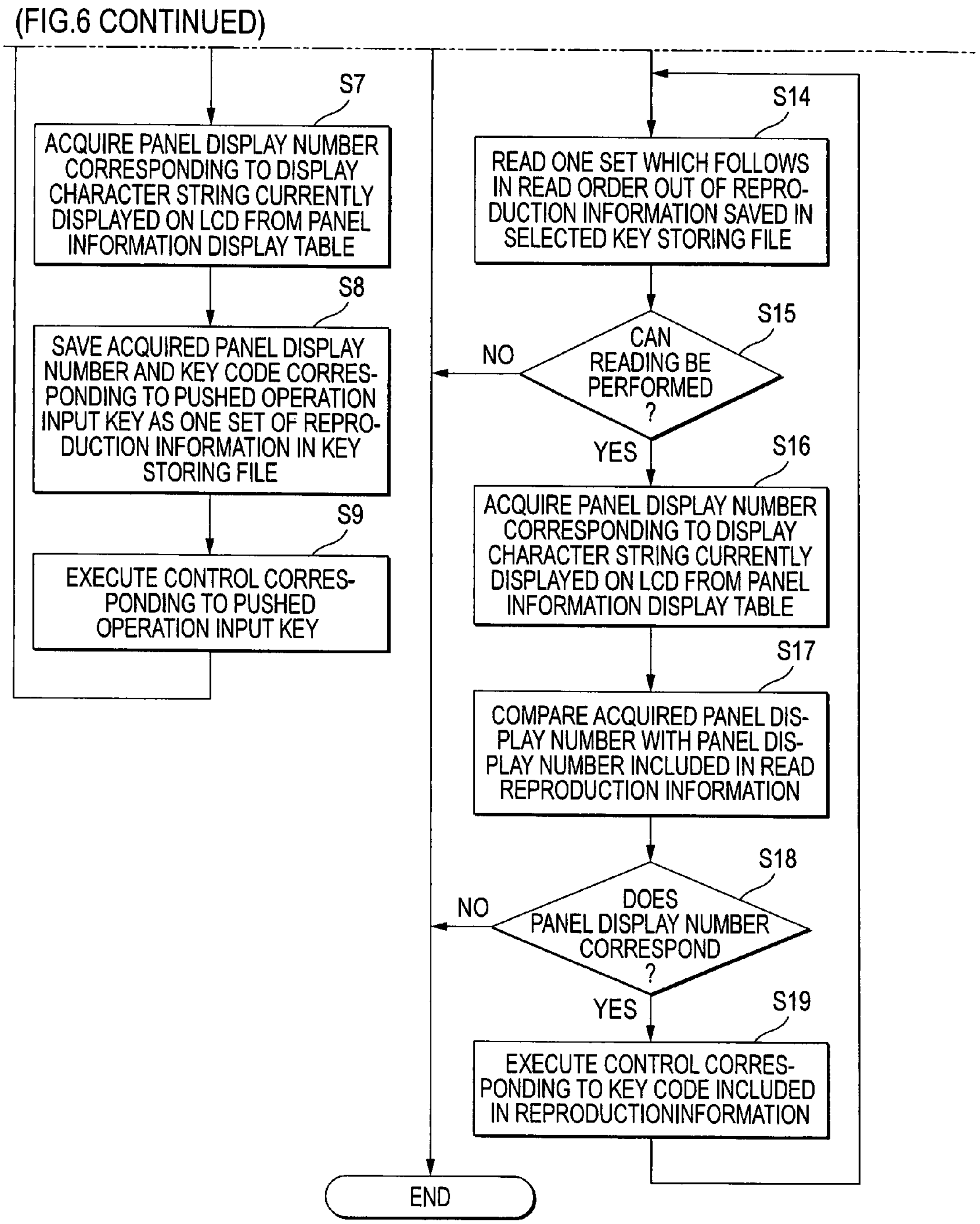
(FIG.6 CONTINUED)
S7
ACQUIRE PANEL DISPLAY NUMBER CORRESPONDING TO DISPLAY CHARACTER STRING CURRENTLY DISPLAYED ON LCD FROM PANEL INFORMATION DISPLAY TABLE
S8
SAVE ACQUIRED PANEL DISPLAY NUMBER AND KEY CODE CORRES-PONDING TO PUSHED OPERATION INPUT KEY AS ONE SET OF REPRO-DUCTION INFORMATION IN KEY STORING FILE
S9
EXECUTE CONTROL CORRES-PONDING TO PUSHED OPERATION INPUT KEY
S14
READ ONE SET WHICH FOLLOWS IN READ ORDER OUT OF REPRO-DUCTION INFORMATION SAVED IN SELECTED KEY STORING FILE
S15
CAN READING BE PERFORMED ?
NO
YES
S16
ACQUIRE PANEL DISPLAY NUMBER CORRESPONDING TO DISPLAY CHARACTER STRING CURRENTLY DISPLAYED ON LCD FROM PANEL INFORMATION DISPLAY TABLE
S17
COMPARE ACQUIRED PANEL DIS-PLAY NUMBER WITH PANEL DIS-PLAY NUMBER INCLUDED IN READ REPRODUCTION INFORMATION
S18
DOES PANEL DISPLAY NUMBER CORRESPOND ?
NO
YES
S19
EXECUTE CONTROL CORRES-PONDING TO KEY CODE INCLUDED IN REPRODUCTIONINFORMATION
END

APPARATUS AND METHOD FOR INFORMATION PROCESSING ACCORDING TO PRODUCTION INFORMATION

CROSS-REFERENCE TO RELATED APPLICATIONS

This application claims priority from Japanese Patent Application No. 2006-258034 filed on Sep. 22, 2006, the entire subject matter of which is incorporated herein by reference.

TECHNICAL FIELD

Aspects of the present invention relate to an information processing apparatus executing various processes in response to an input made by an operator.

BACKGROUND

JP-A-7-160149 discloses a technique for storing an actual key operation performed by an operator in a RAM in the operation order, and reading and reproducing the key operation stored in the RAM in the operation order in pushing a key memory execution key provided on an operation panel.

However, in JP-A-7-160149, the stored key operation order cannot be used in other devices since the key operation is stored in the RAM.

SUMMARY

Aspects of the present invention provide an information processing apparatus capable of using the stored key operation not only in a device storing the key operation but also in other devices to improve usability of the operator.

BRIEF DESCRIPTION OF THE DRAWINGS

FIG. 3A is an exemplary schematic diagram representing a key map stored in a ROM;

FIG. 3B is an exemplary schematic diagram showing a panel display number table stored in the ROM;

FIG. 4 is an exemplary schematic diagram for describing a key storing file;

DETAILED DESCRIPTION

General Overview

Figure 1:
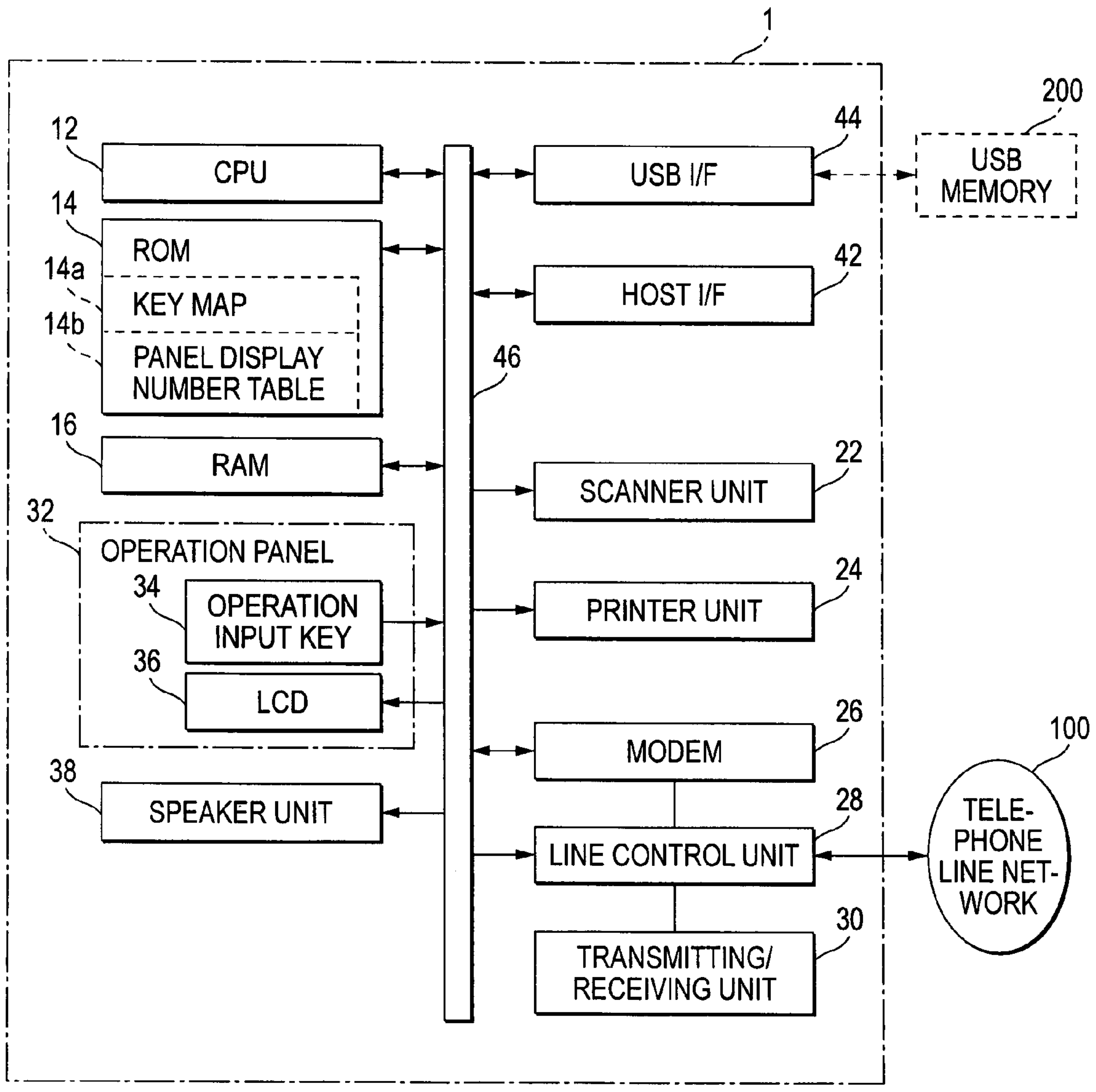
FIG. 1 is an exemplary block diagram of an MFD according to one aspect of the present invention.

According to an aspect of the invention, there is provided an information processing apparatus including: an operating unit into which an operating instruction is input; a display; an attaching unit to which an external storage medium is attachable; and a controller that is operable to: control the information processing apparatus in accordance with the operating instruction input into the operating unit; acquire display information corresponding to a content displayed on the display in inputting the operating instruction whenever the operating instruction is input into the operating unit; sequentially store operation information corresponding to the operating instruction input into the operating unit and the display information corresponding to the content displayed on the display in inputting the operating instruction as one set of reproduction information in the external storage medium whenever the operating instruction is input into the operating unit; read one set of the reproduction information stored in the external storage medium in an order in which the operating instruction is input to the operating unit; acquire display information corresponding to a content displayed on the display in accordance with reading of the one set of the reproduction information; and determine whether the acquired display information corresponding to the content displayed on the display in accordance with the reading of one set of the reproduction information coincides with the display information included in the read reproduction information, wherein the controller is operable to control the information processing apparatus in accordance with the operating instruction included in the read reproduction information when the acquired display information corresponding to the content displayed on the display in accordance with the reading of one set of the reproduction information coincides with the display information included in the read reproduction information.

According to another aspect of the invention, there is provided a method for controlling an information processing apparatus including: receiving an operating instruction input into an operating unit; controlling an information processing apparatus in accordance with the operating instruction input into the operating unit; acquiring display information corresponding to a content displayed on a display in inputting the operating instruction whenever the operating instruction is input into the operating unit; sequentially storing operation information corresponding to the operating instruction input into the operating unit and the display information corresponding to the content displayed on the display in inputting the operating instruction as one set of reproduction information in an external storage medium whenever the operating instruction is input into the operating unit; reading one set of the reproduction information stored in the external storage medium in an order in which the operating instruction is input to the operating unit; acquiring display information corresponding to a content displayed on the display in accordance with reading of the one set of the reproduction information; determining whether the acquired display information corresponding to the content displayed on the display in accordance with the reading of one set of the reproduction information coincides with the display information included in the read reproduction information; and controlling the information processing apparatus in accordance with the operating instruction included in the read reproduction information when the acquired display information corresponding to the content displayed on the display in accordance with the reading of one set of the reproduction information coincides with the display information included in the read reproduction information.

According to still another aspect of the invention, there is provided an information processing apparatus including: an operating unit into which an operating instruction is input; a display; an attaching unit to which an external storage medium is attachable; executing means for executing control of an information processing apparatus in accordance with the operating instruction input into the operating unit; operating state display information acquiring means for acquiring display information corresponding to a content displayed on the display in inputting the operating instruction whenever the operating instruction is input into the operating unit; reproduction information storing means for sequentially storing operation information corresponding to the operating instruction input into the operating unit and the display information acquired by the operating state display information acquiring means as one set of reproduction information in the external storage medium whenever the operating instruction is input into the operating unit; reading means for reading one set of the reproduction information stored in the external storage medium by the reproduction information storing means in an order in which the operating instruction is input to the operating unit; reading state display information acquire means for acquiring the display information corresponding to a content displayed on the display in accordance with reading of the one set of the reproduction information by the reading means; and determining means for determining whether the display information acquired by the reading state display information acquiring means coincides with the display information included in the reproduction information read by the reading means, wherein the executing means executes the control of the information processing apparatus in accordance with the operating instruction included in the reproduction information read by the reading means when the display information acquired by the reading state display information acquiring means coincides with the display information included in the reproduction information read by the reading means.

<Illustrative Aspects>

Illustrative aspects of the present invention will be described below with reference to the accompanying drawings. FIG. 1 is an exemplary block diagram of a multi function device (MFD) 1 according to one aspect of the present invention. The MFD 1 includes various kinds of functions such as a printer function, a copy function, and a scanner function in addition to a facsimile function for realizing facsimile communication via a telephone line network 100 and a voice conversation function for realizing voice conversation via the telephone line network 100 in one unit.

As shown in FIG. 1, the MFD 1 includes a CPU 12 controlling the whole operation of the MFD 1, a ROM 14 storing various kinds of control programs and fixed value data executed by the CPU 12 and including a key map 14*a* and panel display number table 14*b* to be described later, a RAM 16 which is a memory for temporarily storing data and programs or the like required for the various processes executed by the CPU 12, a scanner unit 22, a printer unit 24, a modem 26, and a line control unit 28, a transmitting/receiving unit 30 capable of being removed from a main body part of the MFD 1 and used for transmitting/receiving calls in the voice conversation function, an operation panel 32 including an operation input key 34 and a liquid crystal display (LCD) 36, a speaker unit 38 configured by a speaker and a driving circuit for driving the speaker, a host I/F 42 which is an interface capable of being connected to a control device such as a personal computer, and a USBI/F 44 which is a USB interface capable of attaching and detaching a universal serial bus (USB) memory 200.

Among these, the CPU 12, the ROM 14, the RAM 16, the scanner unit 22, the printer unit 24, the modem 26, the line control unit 28, the operating unit 34, the LCD 36, the speaker unit 38, the host I/F 42 and the USBI/F 44 are connected to each other via a bus line 46. The line control unit 28, and the modem 26 or the transmitting/receiving unit 30 are connected to each other by a transmission path to be described later.

Herein, the scanner unit 22 reads an image from a sheet of document set to a predetermined reading position (not shown) based on an instruction from the CPU 12 and generates the image data of the image. The scanner unit 22 includes a motor for feeding the sheet of document (not shown). The image data read by the scanner unit 22 is transmitted to an opposite party device specified by a telephone number or the like via the modem 26, the line control unit 28 and the telephone line network 100 when the MFD 1 is set to a facsimile mode for operating the facsimile function in the MFD 1. When the MFD 1 is set to a copy mode for operating the copy function in the MFD 1, the image data generated by the scanner unit 22 is printed on recording paper by the printer unit 24. Furthermore, when the MFD 1 is set to a scanner mode for operating the scanner function in the MFD 1, the image data generated by the scanner unit 22 is stored in a predetermined storage area in the RAM 16.

The printer unit 24 is configured by an inkjet printer for printing onto the recording paper set to a predetermined feed position (not shown) based on the instruction from the CPU 12. The printer unit 24 includes a motor (not shown) for feeding the recording paper, a print head (not shown) for discharging an ink on the recording paper, and a carriage motor (not shown) for moving a carriage (not shown) for carrying the print head. When the MFD 1 is set to the facsimile mode and is set so as to print facsimile data received from the opposite party device via the telephone line network 100, the line control unit 28 and the modem 26, the image data generated based on the received facsimile data is printed on the recording paper by the printer unit 24. When the MFD 1 is set to the copy mode, the image data generated by the scanner unit 22 is printed on the recording paper by the printer unit 24.

The modem 26 modulates the image data generated by the scanner unit 22 based on the instruction from the CPU 12 to generate an image signal capable of being transmitted to the telephone line network 100 via the line control unit 28. Further, the modem 26 demodulates the image signal input via the line control unit 28 from the telephone line 100 to the image data.

The line control unit 28 inputs various signals from the telephone line network 100 and outputs the signals to the telephone line network 100. Further, the line control unit 28 sets a transmission path which becomes destination and transmission of the signal output and input between the telephone line network 100 and the transmission path based on the instruction from the CPU 12. Examples of the transmission path include a path traveling to the modem 26 set when the operation is performed for transmitting an image by the operating unit 34 (transmitting facsimile data), or when an image signal is received from the telephone line network 100 (facsimile data is received). Thus, when the path traveling to the modem 26 is set, the path reaches a state where the image signal can be transmitted. In contrast, this set transmission path is canceled, when the output of the image signal by the modem 26 is ended or when the input of the image signal from the telephone line 100 is ended. This path then reaches a state where the image signal is not transmitted. Further, another example of the transmission path includes a path which is set when the operation (off-hook operation) for removing the transmitting/receiving unit 30 from the main body part of the MFD 1 is performed and travels to the transmitting/receiving unit 30 from the line control unit 28. Thus, when the path traveling to the transmitting/receiving unit 30 from the line control unit 28 is set, the path reaches a state where a voice signal can be transmitted. The thus set transmission path is canceled when the operation (on-hook operation) for returning the transmitting/receiving unit 30 to the main body part of the MFD 1 is performed, and this path reaches a state where the voice signal is not transmitted.

Figure 2:
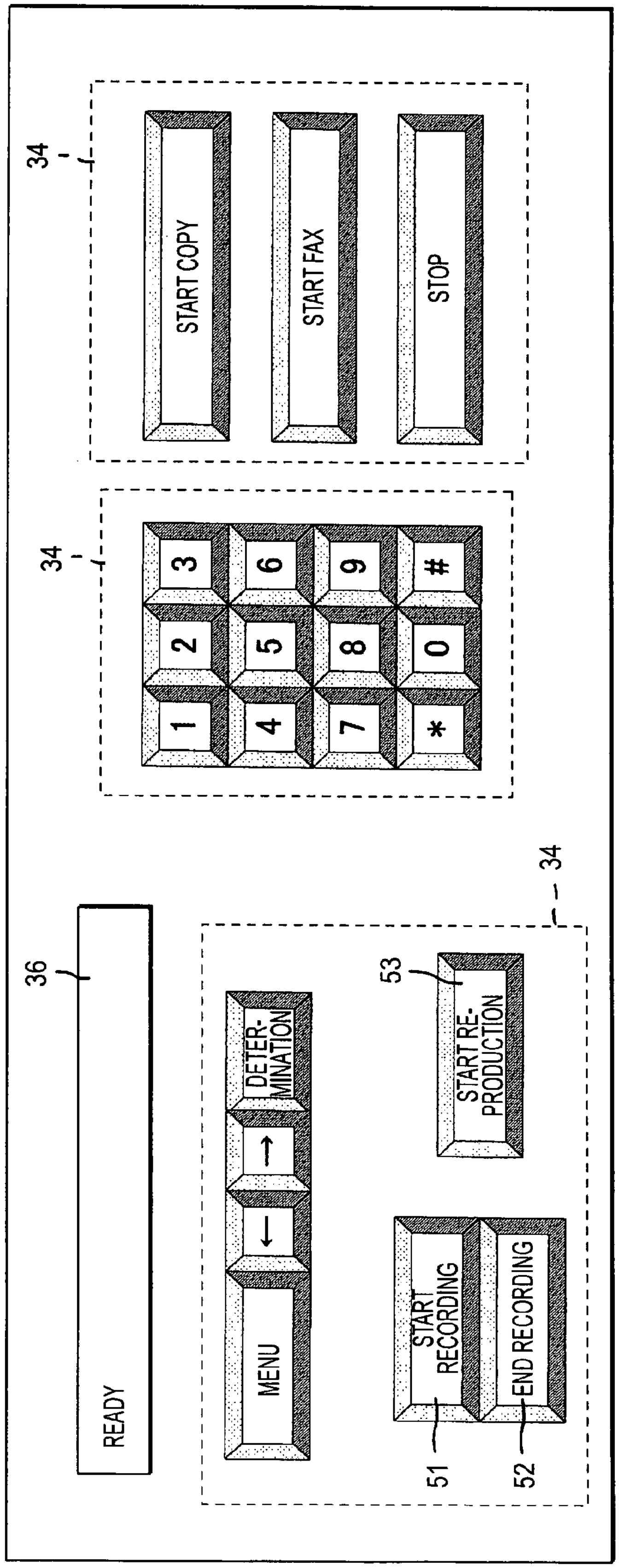
FIG. 2 is an exemplary schematic diagram showing an operation panel.

FIG. 2 is an exemplary schematic diagram showing the operation panel 32. This operation panel 32 is a man interface in the MFD 1. The operator can make the MFD 1 execute various functions via this operation panel 32.

As shown in FIG. 2, a plurality of operation input keys 34 capable of giving the operating instruction to the MFD 1 by the operation (pushing) of the operator are provided in each part of the operation panel 32. A one-line display type LCD 36 displaying the variety of information in the MFD 1 on the operation panel 32 is provided in an upper left part.

As shown in FIG. 2, the MFD 1 includes numerical keys for inputting numerical values, a menu key for displaying an operation menu on the LCD 36, and a scroll key for scrolling the display screen of the LCD 36, a determination key for indicating the determination, a start key for starting copy or fax, and a stop key for stopping a process or operation under execution on the operation panel 32 as a plurality of operation input keys 34.

Further, a record start key 51, a record end key 52, and a reproduction start key 53 are provided as the operation input keys 34 in addition to the above keys on the operation panel 32 of the MFD 1. The record start key 51 indicates the start of the production of a key storing file F (see FIG. 4) to be described later on the USB memory 200. The record end key 52 indicates the end of recording to the key storing file F started by pushing the record start key 51. Further, the reproduction start key 53 indicates the reproduction start of the key storing file F stored in the USB memory 200.

Further, information on the state of the MFD 1 is displayed on the LCD 36. For example, when the MFD 1 is ready for the operation, as shown in FIG. 2, "READY" is displayed on the LCD 36. Further, when not only shown the display of "READY" in FIG. 2 but also in the case of inputting the operation input instruction into the operation input key 34, display character string (for example, "PRINTING" and a numerical value input as a parameter or the like) corresponding to the input operating instruction are displayed.

In the MFD 1, the various display character strings displayed on each operation input key 34 and LCD 36 on the operation panel 32 are respectively managed in the key map 14*a* (see FIG. 3A) in the ROM 14 and the panel display number table 14*b* (see FIG. 3B). Herein, with reference to FIGS. 3A and 3B, the above key map 14*a* and the panel display number table 14*b* will be described. FIG. 3A is an exemplary schematic diagram showing the key map 14*a* stored in the ROM 14. FIG. 3B is an exemplary schematic diagram showing the panel display number table 14*b* stored in the ROM 14.

As shown in FIG. 3A, the key map 14*a* is stored such that each operation input key 34 (string 14*a*2) on the operation panel 32 corresponds to the key code (string 14*a*1). When the operation input key 34 is operated by the operator, the key map 14*a* is converted into the key code to which the operated operation input key 34 corresponds by referring to the key map 14*a* and acquired. For example, when the "MENU KEY" which is the operation input key 34 is operated, "1" is acquired as the key code.

As shown in FIG. 3B, the panel display number table 14*b* is stored so that a Japanese display character string (string 14*b*2) and an English display character string (string 14*b*3) capable of being displayed on the LCD 36, and a panel display number (string 14*b*1) correspond with each other. Herein, as shown in FIG. 3B, in the panel display number table 14*b*, for example, "READY" in Japanese corresponds to "READY" in English in the panel display number of 1, where the display language is different, however, the character string is synonymous.

The character string (display character string) displayed on the LCD 36 is converted to the corresponding panel display number by referring to the panel display number table 14*b*, and is acquired. For example, when the character of "READY" is displayed on the LCD 36, "1" is acquired as the panel display number. Similarly, also when the character of "READY" is displayed on the LCD 36, "1" is acquired as the panel display number.

Thus, in the MFD 1, the synonymous character string group corresponds to the common panel display number in the panel display number table 14*b*. Accordingly, even in a domestic use model in which Japanese is displayed on the LCD 36, or even in an English-speaking world use model in which English is displayed on the LCD 36, the character string displayed on the LCD 36 can be acquired as the same panel display number irrespective of the difference in the display language, if it is a synonymous character string.

Next, with reference to FIG. 4, the key storing file F in which the production is started by the operation (pushing) of the record start key 51 will be described. FIG. 4 is an exemplary schematic diagram for describing the key storing file F.

As shown in FIG. 4, the key storing file F saves (stores) the panel display number (string F1) acquired from the above panel display number table 14*b* and the key code (string F2) acquired from the above key map 14*a* as one set of the reproduction information. Although the details are described later, one set of reproduction information is configured by the key code corresponding to the pushed operation input key 34 and the panel display number corresponding to the display character string displayed on the LCD 36 in inputting the operation input key 34.

This key storing file F is produced by the key operation process (see FIG. 6) to be described later on the opportunity of pushing (operation) of the record start key 51. Then, whenever the operation input key 34 is pushed, every one set of the reproduction information is sequentially saved, and the storage is ended by pushing the record end key 52. That is, one key storing file F saves the input operation (pushing) performed by the operator and the display character string displayed on the LCD 36 in the input operation in the unit of the input operation as the reproduction information in order to operate the MFD 1 after the record start key 51 is pushed and before the record end key 52 is pushed.

For example, when the key storing file F shown in FIG. 4 is produced by sequentially saving the reproduction information to the lower line from the upper line of the figure in the input operation order of the operation input key 34, the contents saved in the key storing file F shown in FIG. 4 show that the following items (1) to (7) are executed by the operator: (1) When "READY" is displayed on the LCD 36, the operator pushes "MENU KEY"; (2) When "SETUP RECEIVE" is displayed on the LCD 36 as a result of "MENU KEY" being pushed, the operator pushes "→ KEY (one of the scroll keys) "; (3) When "SETUP SEND" is displayed on the LCD 36 as a result of "→ KEY" being pushed, the operator pushes "→ KEY" again; (4) When "COPY MODE" is displayed on the LCD 36 as a result of "→ KEY" being pushed again, the operator pushes "DETERMINATION KEY"; (5) When "AUTO" is displayed on the LCD 36 as a result of "DETERMINATION KEY" being pushed, the operator pushes "→ KEY"; (6) When "TEXT" is displayed on the LCD 36 as a result of "→ KEY" being pushed, the operator pushes "→ KEY" again; and (7) When "PHOTO" is displayed on the LCD 36 as a result of "→ KEY" being pushed again, the operator pushes "DETERMINATION KEY." That is, the key storing file F shown in FIG. 4 saves input operation until the ready MFD 1 is made as the copy mode of the quality of image of the photo.

The reproduction information saved in this key storing file F is sequentially read in the saved old order, i.e., in the input operation order of the operation input key 34 in producing the key storing file F by the key operation process (see FIG. 6) to be described later when the reproduction start key 53 is pushed, and the control corresponding to the key code included in the read reproduction information is executed. That is, the behavior of the MFD 1 performed in producing the file F can be reproduced by use of the key storing file F. For example, when the key storing file F shown in FIG. 4 to the ready MFD 1 is reproduced, the MFD 1 can be made as the copy mode of the quality of image of the photo without the operator performing the input operation. Thus, the MFD 1 can be operated as the contents saved in the key storing file F without the operator performing the input operation by using the key storing file F. Accordingly, the time and effort of the input operation performed by the operator can be reduced.

Further, the key storing file F is produced in the USB memory 200 which is a portable external storage medium. Accordingly, the key storing file F can be used not only in the MFD 1 producing the key storing file F but also in other devices operating as the MFD 1. Therefore, even when using other devices operating as the MFD 1, the time and effort of the input operation performed by the operator can be reduced.

Figure 6:
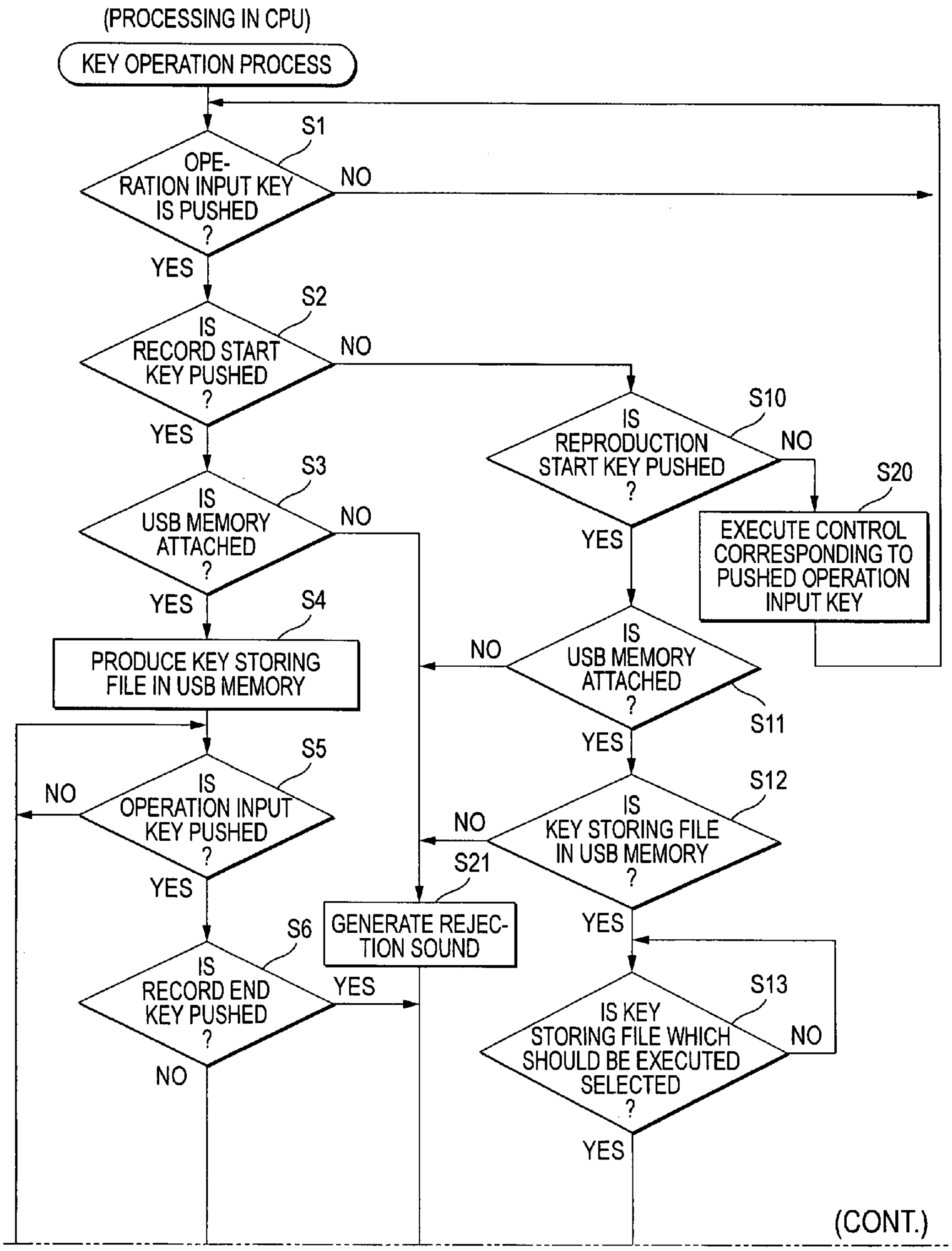
FIG. 6 is an exemplary flow chart showing a key operation process executed by CPU of the MFD.

Next, with reference to FIG. 6, the key operation process executed in the MFD 1 having the above configuration will be described. FIG. 6 is an exemplary flow chart showing the key operation process executed by the CPU 12 of the MFD 1. This key operation process is a process in main processes (not shown) started by applying power supply to the MFD 1, and is repeatedly executed by the loop of the main process.

As shown in FIG. 6, in this key operation process, it is first confirmed whether the operation input key 34 is pushed (S1). If the pushing of the operation input key 34 is not confirmed (S1: No), the process is returned to S1. The process is ready until the operation input key 34 is pushed.

If the operation input key 34 is pushed as a result confirmed by the process of S1 (S1: Yes), it is confirmed whether the pushed operation input key 34 is the record start key 51 (S2). When the record start key 51 is pushed as a result confirmed by the process of S2 (S2: Yes), it is confirmed whether the USB memory 200 is attached to the USBI/F 44 (S3).

If the USB memory 200 is attached to the USBI/F 44 as a result confirmed by the process of S3 (S3: Yes), the key storing file F is produced in the USB memory 200 (S4). Then it is confirmed whether the operation input key 34 is pushed (S5). If the pushing of the operation input key 34 is not confirmed (S5: No), the process is returned to S5, and is ready until the operation input key 34 is pushed.

If the operation input key 34 is pushed as a result confirmed by the process of S5 (S5: Yes), it is confirmed whether the pushed operation input key 34 is the record end key 52 (S6). If the record end key 52 is not pushed as a result confirmed by the process of S6 (S6: No), the panel display number corresponding to the display character string currently displayed on the LCD 36 is acquired from the panel display number table 14*b* (S7).

After the process of S7, the acquired panel display number and the key code corresponding to the operation input key 34 (pushed operation input key 34) confirmed in the process of S5 are saved (stored) as one set of reproduction information in the key storing file F produced by the process of S4 (S8). In this process of S8, the key code corresponding to the pushed operation input key 34 is acquired from the key map 14*a*.

After the process of S8, the control corresponding to the pushed operation input key 34 is executed (S9), and the process is shifted to S5. The display of the LCD 36 is changed into the display according to the pushed operation input key 34 as a result of the process of S9.

In contrast, when the pushed operation input key 34 is the record end key 52 as a result confirmed by the process of S6 (S6: Yes), the production of the key storing file F is ended by ending this key operation process.

Therefore, until the operator pushes the record end key 52 after pushing the record start key 51, the processes of S5 to S9 are repeated. The operation input key 34 input and operated (pushed) by the operator in order to operate the MFD 1 and the display character string displayed on the LCD 36 in each input operation are sequentially saved in the operation order in one key storing file F produced in the USB memory 200.

If the record start key 51 is not pushed as a result confirmed by the process of S2 (S2: No), it is confirmed whether the pushed operation input key 34 is the reproduction start key 53 (S10). When the reproduction start key 53 is pushed as a result confirmed by the process of S10 (S10: Yes), it is confirmed whether the USB memory 200 is attached to the USBI/F 44 (S11).

If the USB memory 200 is attached to the USBI/F 44 as a result confirmed by the process of S11 (S11: Yes), it is confirmed whether the key storing file F is in the USB memory 200 (S12).

If the key storing file F is in the USB memory 200 as a result confirmed by the process of S12 (S12: Yes), it is confirmed whether the key storing file F which should be executed is selected (S13). If the key storing file F is not selected (S13: No), the process is returned to S13, and is ready until the key storing file F which should be executed is selected.

If the key storing file F which should be executed is selected as a result confirmed by the process of S13 (S13: Yes), one set of the reproduction information which follows the read order (that is, first set of the reproduction information in the saved input operation order) is read out of the reproduction information saved in the selected key storing file F (S14), and it is confirmed whether one set can be read (S15).

When one set can be read as a result confirmed by the process of S15 (S15: Yes), the panel display number corresponding to the display character string currently displayed on the LCD 36 is acquired from the panel display number table 14*b* (S16).

The panel display number acquired by the process of S16 is compared with the panel display number included in the reproduction information read by the process of S14 after the process of S16 (S17), and it is confirmed whether these panel display numbers coincide with each other (S18).

If the panel display number acquired by the process of S16 coincides with the panel display number included in the reproduction information read by the process of S14 as a result confirmed by the process of S18 (S18: Yes), the control corresponding to the key code included in the reproduction information read by the process of S14 is executed (S19), and the process is shifted to S14.

In contrast, if the panel display number acquired by the process of S16 does not coincide with the panel display number included in the reproduction information read by the process of S14 as a result confirmed by the process of S18 (S18: No), the reproduction of the key storing file F is ended by ending this key operation process without performing anything.

Further, when the reproduction information cannot be read as a result confirmed by the process of S15 (S15: No), it is shown that the key storing file F is read to the last, and thereby, the key operation process is ended as it is.

Figure 5A:
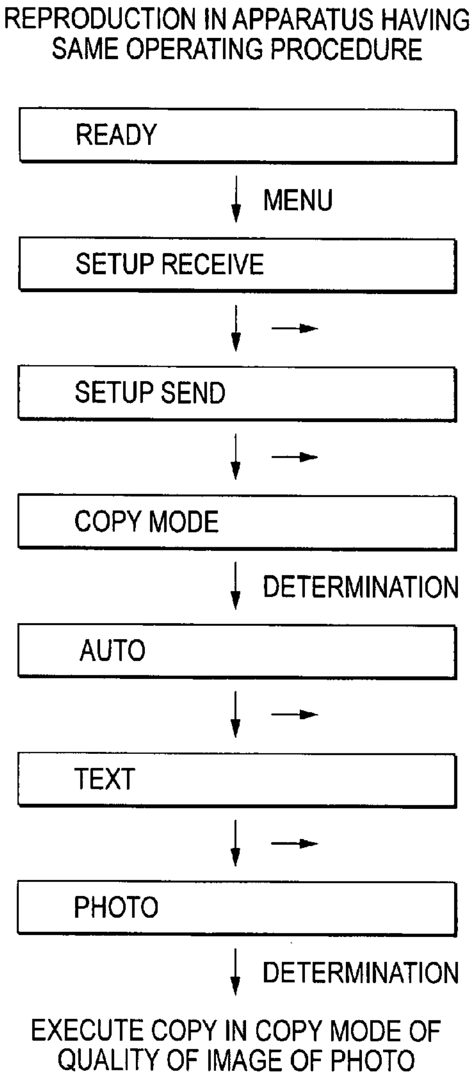
FIGS. 5A and 5B are exemplary views for describing comparison of panel display numbers.
Figure 5B:
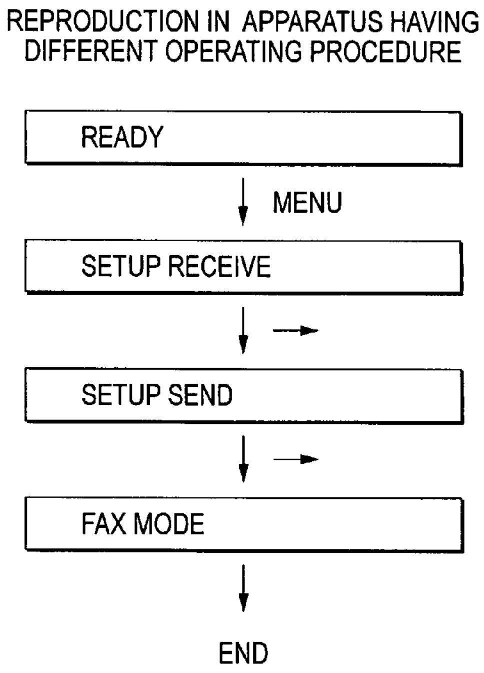

FIGS. 5A and 5B are exemplary views for describing comparison of panel display numbers. That is, FIGS. 5A and 5B are exemplary views showing the display character string displayed on the display and the operation input key corresponding to the key code read out of the key storing file in comparing the panel display numbers. For example, the panel display number "1" corresponding to the display character string "READY" currently displayed on the LCD 36 is acquired by the process S16. In the process of S17, the panel display number "1" acquired by the process of S16 is compared with the panel display number "1" included in the reproduction information read by the process of S14. If the panel display numbers coincide with each other, the control corresponding to the key code included in the reproduction information read by the process of S14, which corresponds to a process when the menu key is pushed, is executed. The process is back to S14, and next one set of the reproduction information (panel display number: 3, key code: 3) is read out of the key storing file F shown in FIG. 4. The panel display number corresponding to the display character string currently displayed on the LCD 36, i.e., the display character string when the menu key is operated from "READY," is compared with the panel display number "3" read from the key storing file F. If the panel display numbers coincide with each other, the control, which corresponds to a process when the "→ KEY" corresponding to the key code "3" is pushed, is executed. Such processes are repeated until all sets of the reproduction information are read (see FIG. 5A) or the panel display numbers do not coincide with each other (see FIG. 5B).

Therefore, when the operator pushes the reproduction start key 53 in a state where the USB memory 200 storing the key storing file F is attached to the USBI/F 44, the processes of S14 to S19 are repeated, and the reproduction information is sequentially read in the saved input operation order from the key storing file F. The control according to the key code included in the reproduction information is executed. Thereby, the behavior of the MFD 1 executed in producing the key storing file F can be reproduced.

However, the execution (that is, the process of S19) of the control according to the key code included in the reproduction information is performed when the correspondence of the panel display number corresponding to the display character string currently displayed on the LCD 36 and panel display number included in the reproduction information is confirmed by the process of S18. That is, it is determined whether the read reproduction information can be used by comparing these panel display numbers before the execution of the control according to the key code included in the reproduction information. Only when it is determined that the reproduction information can be used, the control according to the reproduction information is executed. Therefore, the control following the reproduction information is executed only by the device capable of using the reproduction information. Accordingly, the input instruction can be reliably reproduced by the operator, that is, the operation desired by the operator can be reliably executed.

In contrast, when the dissidence of the panel display number corresponding to the display character string currently displayed on the LCD 36 and panel display number included in the reproduction information is confirmed by the process of S18, the execution of the control according to the key code included in the reproduction information is inhibited. That is, it is determined whether the read reproduction information can be used by comparing these panel display numbers before the execution of the control according to the key code included in the reproduction information. When it is determined that the reproduction information cannot be used, the control following the reproduction information is not performed. Therefore, the control using the reproduction information which cannot be used is not executed even when the key storing file F is applied to the device which is not correctly operated by the reproduction information saved in the key storing file F. Accordingly, the control error due to the mistaken operation can be avoided, and the wasted time due to error release can be suppressed to prevent the loss of operability made by the operator.

When the panel display number acquired by the process of S16 does not coincide with the panel display number included in the reproduction information read by the process of S14, and the branching process of No is executed in S18, the display of the LCD 36 may be changed into the selection screen of the key storing file F and the ready screen or the like before ending the key operation process, and the nonusable key storing file F currently used may be informed to the operator. The control error is avoided as described above even if it is changed into these displays. Accordingly, the operator can smoothly execute the next operation.

Since the key storing file F cannot be produced or reproduced if the USB memory 200 is not attached to the USBI/F 44 as a result confirmed by the process of S3 or S11 (S3: No, S11: No), a rejection sound is generated from the speaker unit 38 (S21), and this key operation process is ended.

Further, since the key storing file F cannot be reproduced also when the key storing file F does not exist in the USB memory 200 as a result confirmed by the process of S12 (S12: No), the rejection sound is generated from the speaker unit 38 (S21), and this key operation process is ended.

Further, if the reproduction start key 53 is not pushed as a result confirmed by the process of S10 (S10: No), the control corresponding to the pushed operation input key 34 is executed (S20), and the process is shifted to S1.

As described above, according to the MFD 1, the input operation of the operation input key 34 after the operator pushes the record start key 51 is saved as the key storing file F in the USB memory 200 which is the portable external storage medium. Accordingly, the time and effort of the input operation performed by the operator can be reduced by attaching the USB memory 200 to other devices, and by using this key storing file F even when using other devices.

Herein, according to the MFD 1, the control according to the key code included in the reproduction information in reproducing the key storing file F is executed when the panel display number corresponding to the display character string currently displayed on the LCD 36 coincides with the panel display number included in the reproduction information. Accordingly, the operation in which the reproduction is desired by the operator can be reliably executed.

In contrast, it is confirmed whether the panel display number corresponding to the display character string currently displayed on the LCD 36 coincides with the panel display number included in the reproduction information when reproducing the key storing file F before the control according to the key code included in the read reproduction information is executed. When these panel display numbers do not coincide with each other, the process is ended without executing the control according to the key code included in the reproduction information. That is, it is confirmed whether the read reproduction information can be used before the execution of the control. When this reproduction information cannot be used, the control following the reproduction information is not performed. Therefore, the control using the reproduction information which cannot be used is not executed even when the key storing file F is applied to the device which is not correctly operated by the reproduction information saved in the key storing file F. Accordingly, the control error due to mistaken operation can be avoided, and the wasted time due to error release can be suppressed to prevent the loss of operability by the operator.

Furthermore, the synonymous character string group corresponds to the common panel display number in the panel display number table 14*b* according to the MFD 1. Thus, even in a domestic use model in which Japanese is displayed on the LCD 36, or even in an English-speaking world use model in which English is displayed on the LCD 36, the character string displayed on the LCD 36 can be acquired as the same panel display number irrespective of the difference in the display language, if the character string is a synonymous character string. Therefore, since the same panel display number is used for the synonymous character string group, the key storing file F (reproduction information) stored in the USB memory 200 can be widely used for devices in which the character string displayed on the LCD 36 does not coincide completely but the synonymous character string is displayed. Accordingly, usability of the operator is improved. For example, the key storing file F stored in the USB memory 200 in the domestic use model in Japan can be used for the English-speaking world use model overseas, and has a high level of usability.

The processes of S9, S19 and S20 may function as the executing means. The process of S7 may function as the operating state display information acquiring means. The process of S8 may function as the reproduction information storage means. The process of S14 may function as the reading means. The process of S16 may function as the reading state display information acquiring means. The process of S18 may correspond to the determining means. The branching process of No in S18 may correspond to the execution inhibiting means.

Aspects of the present invention may not be limited to the above, and it can be easily inferred that various improved modifications can be made.

For example, the production of the key storing file F in the USB memory 200 by the MFD 1 and the reproduction of the input operation by the key storing file F stored in the USB memory 200 in the MFD 1 have been described. However, the device for producing and reproducing the key storing file F is not limited to this MFD 1. A device (information processing apparatus) which operates corresponding to the key operation by the operator and in which the display corresponding to the key operation is displayed on the displaying unit such as the LCD can be applied.

Further, although a storage destination of the key storing file F has been made as the USB memory 200, a storage destination and a reading source are not limited to the USB memory. For example, external storage media such as a compact Flash®, a memory Stick®, a smart Medium®, a flexible disk, a compact disc, a DVD, an optical disc and an external hard disk may be used as the storage destination or the reading source. Further, various external storage media including the above illustrated USB memory 200 may be used as the storage destination and the reading source by using a personal computer which is not directly connected to the MFD 1 and is connected to the MFD 1 via the host I/F 42 and an external drive device connected via the corresponding interface.

Although the case where one key storing file F is stored in the USB memory 200 has been illustrated, a file name may be automatically attached or may be attached by the operation of the operator when the new key storing file F is produced in the process of S4 in the key operation process (see FIG. 6). Further, in the process of S13 in the key operation process (see FIG. 6), a desired file may be suitably selected from a plurality of key storing files F by the user.

Further, although the panel display number indirectly showing the display character string (Japanese, English) displayed on the LCD 36 has been used as information saved in the key storing file F, one showing directly the display character string itself displayed on the LCD 36 may be used.

Further, although the panel display number of 1 has corresponded to the synonymous display character string in which the display language is different in the panel display number table 14*b*, aspects of the present invention is not limited to this, and even the same Japanese may correspond to the common panel display number in the synonymous display character string without limiting the difference in the display languages.

What is claimed is:

1. An information processing apparatus comprising:

an operating unit into which an operating instruction is input;

a display;

an attaching unit to which an external storage medium is attachable; and a controller that is operable to:

control the information processing apparatus in accordance with the operating instruction input into the operating unit;

acquire display information corresponding to a content displayed on the display in inputting the operating instruction whenever the operating instruction is input into the operating unit;

sequentially store operation information corresponding to the operating instruction input into the operating unit and the display information corresponding to the content displayed on the display in inputting the operating instruction as one set of reproduction information in the external storage medium whenever the operating instruction is input into the operating unit;

read one set of the reproduction information stored in the external storage medium in an order in which the operating instruction is input to the operating unit;

acquire display information corresponding to a content displayed on the display in accordance with the reading of the one set of the reproduction information; and determine whether the acquired display information corresponding to the content displayed on the display in accordance with the reading of one set of the reproduction information coincides with the display information included in the read reproduction information, wherein the controller controls the information processing apparatus in accordance with the operating instruction included in the read reproduction information when the acquired display information corresponding to the content displayed on the display in accordance with the reading of one set of the reproduction information coincides with the display information included in the read reproduction information, and wherein the controller inhibits the control of the information processing apparatus in accordance with the operating instruction included in the read reproduction information when the acquired display information corresponding to the content displayed on the display in accordance with the reading of one set of the reproduction information does not coincide with the display information included in the read reproduction information.

2. The information processing apparatus according to claim 1, wherein the controller is operable to repeat predetermined operations including:

the reading the one set of the reproduction information stored in the external storage medium;

the acquiring the display information corresponding to the content displayed on the display in accordance with the reading of the one set of the reproduction information;

the determining whether the acquired display information corresponding to the content; and the controlling the information processing apparatus in accordance with the operating instruction included in the read reproduction information.

3. The information processing apparatus according to claim 2, wherein the controller is further operable to terminate the repeating the predetermined operations when the acquired display information corresponding to the content displayed on the display in accordance with the reading of one set of the reproduction information does not coincide with the display information included in the read reproduction information.

4. The information processing apparatus according to claim 1, further comprising:

a display information storing unit that stores a character string that is capable of being displayed on the display and an identification code common to a character string group synonymous with the character string such that the character string and the identification code are associated with each other, wherein the controller acquires the identification code corresponding to the character string displayed on the display as the display information from the display information storing unit.

5. The information processing apparatus according to claim 4, wherein the identification code is a code common to a synonymous character string group in which a display language is different.

6. A method for controlling an information processing apparatus comprising:

receiving an operating instruction input into an operating unit; controlling an information processing apparatus in accordance with the operating instruction input into the operating unit;

acquiring display information corresponding to a content displayed on a display device in inputting the operating instruction whenever the operating instruction is input into the operating unit;

sequentially storing operation information corresponding to the operating instruction input into the operating unit and the display information corresponding to the content displayed on the display in inputting the operating instruction as one set of reproduction information in an external storage medium whenever the operating instruction is input into the operating unit;

reading one set of the reproduction information stored in the external storage medium in an order in which the operating instruction is input to the operating unit;

acquiring display information corresponding to a content displayed on the display in accordance with the reading of the one set of the reproduction information;

determining whether the acquired display information corresponding to the content displayed on the display in accordance with the reading of one set of the reproduction information coincides with the display information included in the read reproduction information; and controlling the information processing apparatus in accordance with the operating instruction included in the read reproduction information when the acquired display information corresponding to the content displayed on the display in accordance with the reading of one set of the reproduction information coincides with the display information included in the read reproduction information, and inhibiting the control of the information processing apparatus in accordance with the operating instruction included in the read reproduction information when the acquired display information corresponding to the content displayed on the display in accordance with the reading of one set of the reproduction information does not coincide with the display information included in the read reproduction information.

7. An information processing apparatus comprising:

an operating unit into which an operating instruction is input;

a display;

an attaching unit to which an external storage medium is attachable;

executing means for executing control of an information processing apparatus in accordance with the operating instruction input into the operating unit;

operating state display information acquiring means for acquiring display information corresponding to a content displayed on the display in inputting the operating instruction whenever the operating instruction is input into the operating unit;

reproduction information storing means for sequentially storing operation information corresponding to the operating instruction input into the operating unit and the display information acquired by the operating state display information acquiring means as one set of reproduction information in the external storage medium whenever the operating instruction is input into the operating unit;

reading means for reading one set of the reproduction information stored in the external storage medium by the reproduction information storing means in an order in which the operating instruction is input to the operating unit;

reading state display information acquire means for acquiring the display information corresponding to a content displayed on the display in accordance with the reading of the one set of the reproduction information by the reading means;

determining means for determining whether the display information acquired by the reading state display information acquiring means coincides with the display information included in the reproduction information read by the reading means; and execution inhibiting means for inhibiting the control of the information processing apparatus executed by the execution means in accordance with the operating instruction included in the reproduction information read by the reading means when the display information acquired by the reading state display information acquiring means does not coincide with the display information included in the reproduction information read by the reading means, wherein the executing means executes the control of the information processing apparatus in accordance with the operating instruction included in the reproduction information read by the reading means when the display information acquired by the reading state display information acquiring means coincides with the display information included in the reproduction information read by the reading means.

8. The information processing apparatus according to claim 7, further comprising:

display information storing means for storing a character string that is capable of being displayed on the display and an identification code common to a character string group synonymous with the character string such that the character string and the identification code are associated with each other, wherein the operating state display information acquiring means and the reading state display information acquiring means acquire the identification code corresponding to the character string displayed on the display as the display information from the display information storing means.

9. The information processing apparatus according to claim 8, wherein the identification code is a code common to a synonymous character string group in which a display language is different.

* * * * *